United States Patent
Zhao et al.

(10) Patent No.: US 9,781,150 B1
(45) Date of Patent: *Oct. 3, 2017

(54) MAN IN THE MIDDLE ATTACK DETECTION USING ACTIVE LEARNING

(71) Applicant: Cylance Inc., Irvine, CA (US)

(72) Inventors: Xuan Zhao, Irvine, CA (US); Brian Michael Wallace, Irvine, CA (US)

(73) Assignee: Cylance Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/283,051

(22) Filed: Sep. 30, 2016

(51) Int. Cl.
  *G06F 12/14* (2006.01)
  *H04L 29/06* (2006.01)
  *G06N 99/00* (2010.01)

(52) U.S. Cl.
  CPC ....... *H04L 63/1433* (2013.01); *G06N 99/005* (2013.01)

(58) Field of Classification Search
  None
  See application file for complete search history.

(56) References Cited

U.S. PATENT DOCUMENTS

| | | | | |
|---|---|---|---|---|
| 8,424,091 B1 * | 4/2013 | Su | ............... | H04L 51/12 713/187 |
| 8,448,245 B2 * | 5/2013 | Banerjee | ............... | G06F 21/51 709/224 |
| 8,756,693 B2 * | 6/2014 | Dube | ............... | G06F 21/564 713/188 |
| 8,869,277 B2 * | 10/2014 | Radinsky | ............... | G06F 21/56 726/23 |
| 2012/0304296 A1 | 11/2012 | Shulman et al. | | |
| 2013/0097710 A1 | 4/2013 | Basavapatna et al. | | |
| 2013/0303159 A1 | 11/2013 | Gathala et al. | | |
| 2014/0359777 A1 | 12/2014 | Lam et al. | | |

OTHER PUBLICATIONS

U.S. Appl. No. 15/045,071, filed Feb. 16, 2016, Wallace et al.

* cited by examiner

*Primary Examiner* — Brandon Hoffman
(74) *Attorney, Agent, or Firm* — Jones Day

(57) ABSTRACT

Data is received that includes a plurality of samples that each characterize interception of data traffic to a computing device over a network. Thereafter, the plurality of samples characterizing the interception of data traffic are grouped into a plurality of clusters. At least a portion of the samples are labeled to characterize a likelihood of each such sample as relating to an unauthorized interception of data traffic. Each cluster is assigned with a label corresponding to a majority of samples within such cluster. At least one machine learning model is trained using the assigned labeled clusters such that, once trained, the at least one machine learning model determines a likelihood of future samples as relating to an unauthorized interception of data traffic to a corresponding computing device.

28 Claims, 4 Drawing Sheets

MAN IN THE MIDDLE ATTACK DETECTION USING ACTIVE LEARNING

TECHNICAL FIELD

The subject matter described herein relates to the detection of man in the middle interceptions of network data using active learning.

BACKGROUND

Computing environments are becoming increasingly complex as networks exchange data amongst large number of nodes (e.g., clients, mobile computing devices, servers, etc.) via various gateways (e.g., routers, etc.) and using various communications protocols. Such complexity makes such networks susceptible to security breaches and other types of unauthorized access to such communications. One type of unauthorized access is a man in the middle (MITM) attack in which a node or other agent redirects or otherwise intercepts communications between two other nodes within the computing environment. Such MITM attacks can go unnoticed for long periods of time which, in turn, allow the attackers to obtain sensitive and damaging information such as payment credentials and the like.

SUMMARY

In one aspect, data is received that includes a plurality of samples that each characterize interception of data traffic to a computing device over a network. Thereafter, the plurality of samples characterizing the interception of data traffic are grouped into a plurality of clusters. At least a portion of the samples are labeled to characterize a likelihood of each such sample as relating to an unauthorized interception of data traffic. Each cluster is assigned with a label corresponding to a majority of samples within such cluster. At least one machine learning model is trained using the assigned labeled clusters such that, once trained, the at least one machine learning model determines a likelihood of future samples as relating to an unauthorized interception of data traffic to a corresponding computing device.

The grouping can include determining a similarity metric for each sample in relation to each other sample such that the clusters are grouped using the determined similarity metrics.

At least one cluster can be divided, using a divisive clustering algorithm, until a threshold number of samples within each cluster has a same label. With such an arrangement, each cluster assigned with a label can include at least one cluster divided using the divisive clustering algorithm.

The samples can encapsulate attributes such as originating IP address of a request, media access control (MAC) addresses for intervening routers, geo-location of a receiving computing device, time of day, frequency of requests, data packet size and frequency, data transfer protocol, whether or not compression was requested, Domain Name System (DNS) values, multicast Domain Name System (mDNS) values, packet payload information, data type of returned information, or whether returned information is a truncated version of expected returned information.

A new sample can be received, in real-time during operation of a second computing device, that characterizes interception of data traffic to the second computing device. It can be then determined, using, the machine learning model, whether the new sample relates to an unauthorized interception of data traffic to the second computing device. Data can be provided that characterizes the determination of whether the new samples relates to an unauthorized interception of data traffic to the second computing device.

The providing data characterizing the determination of whether the new samples relates to an unauthorized interception of data traffic to the second computing can include one or more of: displaying such data in an electronic visual display, transmitting such data to a remote computing system, loading such data into memory, or persisting such data into a physical data storage medium.

The labeling can include presenting, in a graphical user interface, an exemplary sample from each cluster, and receiving, via the graphical user interface (e.g., user input, etc.), a label for the corresponding exemplary sample for each cluster.

In an interrelated aspect, data received and/or transmitted by a computing device over a network is monitored so that interceptions of such monitored data can be identified. It is determined, using a machine learning model, that at least one of the identified interceptions of the monitored data is unauthorized. Data characterizing the determined at least one unauthorized identified interceptions of the monitored data is then provided. The machine learning model can be trained using assigned label clusters generated by receiving data comprising a plurality of historical samples that each characterize interception of data traffic to a computing device over a network, grouping the plurality of historical samples characterizing into a plurality of clusters, labeling at least a portion of the historical samples to characterize a likelihood of each such sample as relating to an unauthorized interception of data traffic, and assigning each cluster with a label corresponding to a majority of historical samples within such cluster.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for determining or otherwise characterizing the likelihood of interceptions of network data as being man in the middle attacks.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to the use of active learning to facilitate detection of whether communications between two computing nodes is likely to have been intercepted as part of a MITM attack. Active learning as used herein can be characterized as a special case of semi-supervised machine learning in which a learning algorithm can interactively query a user (or some other information source) to obtain desired outputs at new data points. The key idea behind active learning is that a machine learning algorithm can achieve greater accuracy with fewer training labels if it is allowed to choose the data from which it learns. An active learner may pose queries, usually in the form of unlabeled data instances to be labeled by an oracle (e.g., a human annotator). The semi-supervised nature of active learning allows the algorithm to query the user in an online manner and only needs to query for limited amount of labels, so as to not abuse the use of user's time and effort. Active learning is advantageous as used herein because unlabeled data may be abundant or easily obtained, but labels are difficult, time-consuming, or expensive to obtain.

Figure 1:
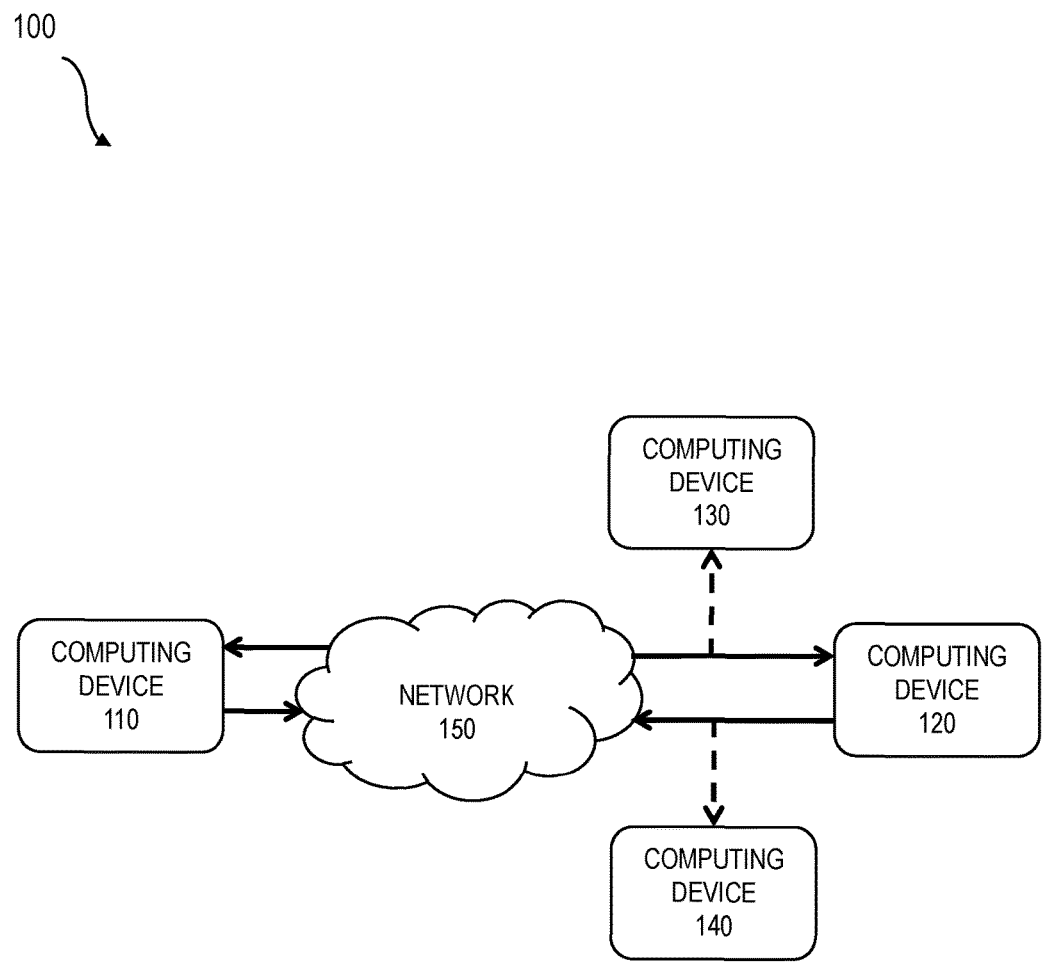
FIG. 1 is a diagram illustrating interception of data received or transmitted by a computing device over a network.

FIG. 1 is a simplified diagram 100 illustrating the interception of data traffic between a first computing device 110 and a second computing device 120 over a wired and/or wireless network 150. As one example, a third computing device 130 intercepts data transmitted by the first computing device 110 to the second computing device 120. As another example, a fourth computing device 140 intercepts data transmitted data by the second computing device 120 to the first computing device 110. The current subject matter monitors such data interceptions to generate samples as provided below. The monitoring can take place at, for example, the first computing device 110 to monitor incoming and/or outgoing data packets. To do this monitoring, computing device 110 sends network packets to computing device 120 with the expectation that computing device 120 will respond with a predictable response. Monitoring detects data interceptions by computing device 130 and/or computing device 140 when information returned by computing device 120 to computing device 110 does not match the expected results.

Figure 2:
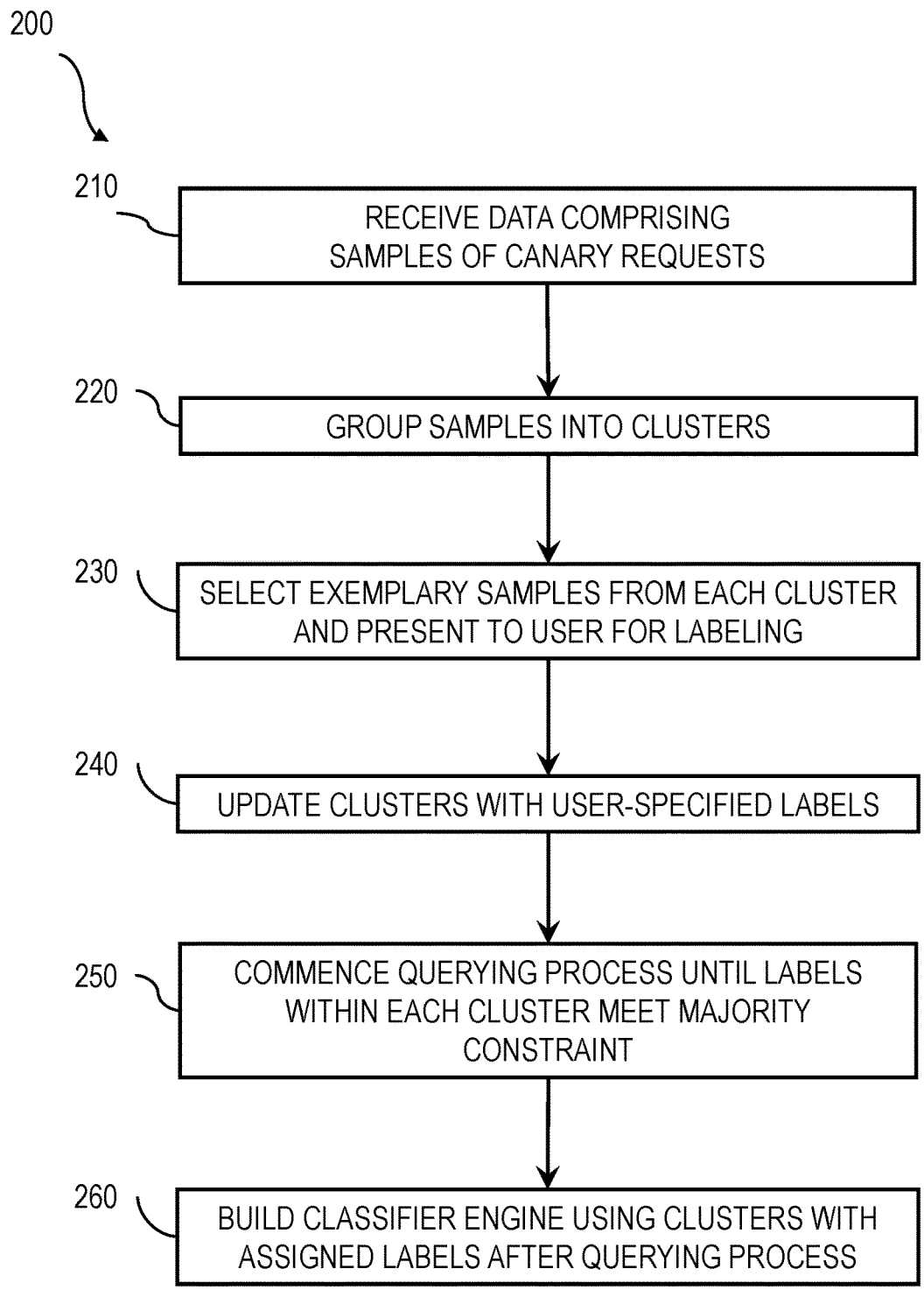
FIG. 2 is a process flow diagram illustrating the generation of a dataset used to train a machine learning model to determine unauthorized interceptions of data.

FIG. 2 is a process flow diagram 200 illustrating active learning as applied to MITM attacks. Initially, at 210, data is received or otherwise collected that characterizes each of a plurality of canary requests (such data is referred to hereinafter as a "sample") across a plurality of computing nodes (e.g., mobile phones, tablets, laptops and other computing devices) in different environments. Such data can be collected, for example, as provided as described above. Each sample can include various types of attributes regarding the potential MITM attack including, without limitation: originating IP address of the request, media access control (MAC) addresses for intervening routers, geo-location of the receiving computing device (i.e., location of mobile phone, laptop, tablet, etc.), time of day, frequency of requests, data packet size and frequency, data transfer protocol, whether or not compression was requested, Domain Name System (DNS) values, multicast Domain Name System (mDNS) values, packet payload information, data type of the information returned, whether the returned information is a truncated version of the information expected, and the like. In some variations, the specified attributes are pre-defined while in other variations the specified attributes can be determined as part of a clustering process (based on similarity metrics and the like). With current subject matter, whether the interception of traffic detected through a canary request is truly an attack or not is not known. As a result, at least a portion of the samples are unlabeled (i.e., the ultimate outcome of whether or not an MITM attack occurred and/or an MITM attack was successful is not known). This labeling is omitted on some or all of the samples because labeling can require manual analysis by human beings and can, thus, be costly. The samples can be vectorized into attributes which specify pre-selected aspects of the data in the samples to further facilitate clustering.

Subsequently, at 220, the samples are grouped to form a plurality of clusters such that, for each cluster, the corresponding samples in such cluster are more similar (based on one or more of the associated attributes in the samples) to each other as compared to samples in other clusters. Such similarity analyses can use, for example, similarity measures/functions to quantify the similarity between each respective sample (i.e., generate similarity metrics, etc.). For example, the similarity measure between two samples can be based on the inverse of the squared Euclidean distance between such samples. Using the similarity metrics, various types of clustering techniques can be used singly, or in combination, including, without limitation, hierarchical clustering, centroid-based clustering (e.g., k-means clustering, etc.), distribution-based clustering, density based clustering to form the groups of samples.

Once the clusters have been formed, at 230, exemplary samples can be selected from each cluster and a user can then be prompted to provide labels for each sample. Such prompting can, for example, be performed via a graphical user interface and/or workflow software package. The labels can indicate a likelihood of the sample pertaining to a MITM attack. The labels, for example, can indicate, likely MITM attack, possible MITM attack, and unlikely MITM attack.

The sample representative of each cluster can, in some variations, be selected randomly; however, such an arrangement is not always efficient because such selections might be for ambiguous or outlier samples. In other variations, a query by committee method can be utilized in which classifications are performed on all the unlabeled samples with different classification models that are trained with the current labeled data. With such an arrangement, the set of the all classification models obtained in this manner can be described as $\emptyset$. Then, $g1$ and $g2$ can be randomly chosen where $g1, g2 \in \emptyset$. If the classification results of $g1$ and $g2$ on a sample s do not agree (i.e. $g1(s) \neq g2(s)$, etc.), then a label can be queried. If the classification results of $g1$ and $g2$ agree, then there is no query.

Thereafter, at 240, the clusters can be updated with the labels specified by the users. For this purpose, a naïve approach can be used to count the percentage of the majority label in a certain cluster, if the percentage is larger than a predefined threshold, e.g. 70%, then the cluster is maintained without change. Otherwise, the cluster can be divided into two following a hierarchical (divisive) clustering algorithm. With such a divisive clustering algorithm, a set of all clusters that satisfy this majority label constraint can be denoted as $\xi$. For example, in one cluster, there are 10 labeled samples, if 8 of them are positive labels (i.e., the samples satisfy the majority label constraint), then the label for the cluster is maintained. However, if only 6 of the samples are positive and 4 of the samples are negative (i.e., the samples do not satisfy the majority label constraint), then a divisive clustering can be performed. In other variations, a cost function L can be defined and the sample labels provided by users can be used as restrictions Γ to an optimization problem that minimizes L subjective to the restrictions Γ. In one example, a cost function L can be the sum of squared errors (SSE), (SSE=$\Sigma_{i=1}^{k}\Sigma^{+}\{p \in C\_i\}(p-m\_i)^2$, as shown below)

$$E = \sum_{i=1}^{k} \sum_{p \in C_i} (p - m_i)^2,$$

where k is the number of clusters, m_i is the center point of a cluster, C_i is the set of all the points in cluster i. The restriction Γ can be points with different labels shouldn't be in one cluster, so we penalize the case where different labels fall in one cluster. So if a majority label for a cluster is y, the real label for sample j inside the cluster is y'_j, then Γ=$\Sigma_j$ y log(y'_j). With Lagrange multiplier, the cost function to minimize becomes:

L=SSE+λΓ

The cluster assignment for minimizing L can then be changed.

If all clusters satisfy the majority label constraint, that is, all clusters satisfy c ∈ξ, querying can be stopped; otherwise, the querying process can continue as provided above.

If the determination is made to stop querying, at 250, all the samples in one cluster can be assigned its majority label. This fully labeled dataset can then be used, at 260, to build a classifier, which, in turn, can be used to classify new/subsequent samples.

The algorithm of FIG. 2 can also be represented as provided below in Table 1.

TABLE 1

Algorithm 1 Active Learning for MITM

1: procedure ACTIVELEARNING
2:   for i ∈ {0, 1, . . . , $N_{canaryRequiredCollected}$} do
3:     $v_i$ ← Vectorize(CanaryRequest$_i$}
4:     C ← clustering ({$v_i$})
5:     while !(c ∈ ξ for ∀c ∈ C) do
6:       for c ∈ C do
7:         query label L($v_i$) for $v_i$, $v_i$ is selected from c
8:     C ← clustering({$v_i$}) by minimizing cost function L subjective to constraintes supplied by the human labels L($v_i$);
9:   for i ∈ {0, 1, . . . , $N_{canaryRequestCollected}$} do
10:    L($v_i$) ← majority label of the cluster c, where $v_i$ ∈ c
11:   Use {$v_i$⇒L($v_i$)} to build classifier for classifying upcoming canary request.

With the algorithms described herein and illustrated in FIG. 2 and also represented in Table 1, a classifier engine can be built, at 260, to provide an indication of the likelihood of the interception of traffic detected through a canary request is an MITM attack. This classifier engine can be built such that the need to query humans for labels is minimized, thus the labels can be collected in an online manner. Stated differently, once a certain amount of labels are collected, the classifier engine can classify upcoming canary requests as they are received. In some cases, the classifier engine can be further trained using subsequently received canary requests.

The classifier engine can also be further trained using canary requests with known outcomes.

The algorithms described herein and illustrated in FIG. 2 and provided in Table 1 can label a first portion of data collected by a user, and the collection can continue until such time that a majority labeling threshold is met for all defined clusters. The unlabeled data will be labeled with the majority label of the cluster it belongs to. Labeled data will still retain the label it has been assigned to. With the labels for all the samples collected this way, such data can be used to train a classifier, which can predict the label for the coming data. The classifier can, for example, be a machine learning model such as a random forest, a neural network, a logistic regression model, a support vector machine, or other similarly operating models trained using historical data from either a single user or a population of users with known outcomes and/or labels. The training of such models can be such that a first subset of the data (e.g. 70%) can be used for training, a second subset of the data (e.g. 30%) can be used for testing, a loss function can be defined, and a relationship between the output label and the input data can be determined. The parameters in this relationship will be gradually updated in order to minimize the loss calculated from the loss function.

Figure 3:
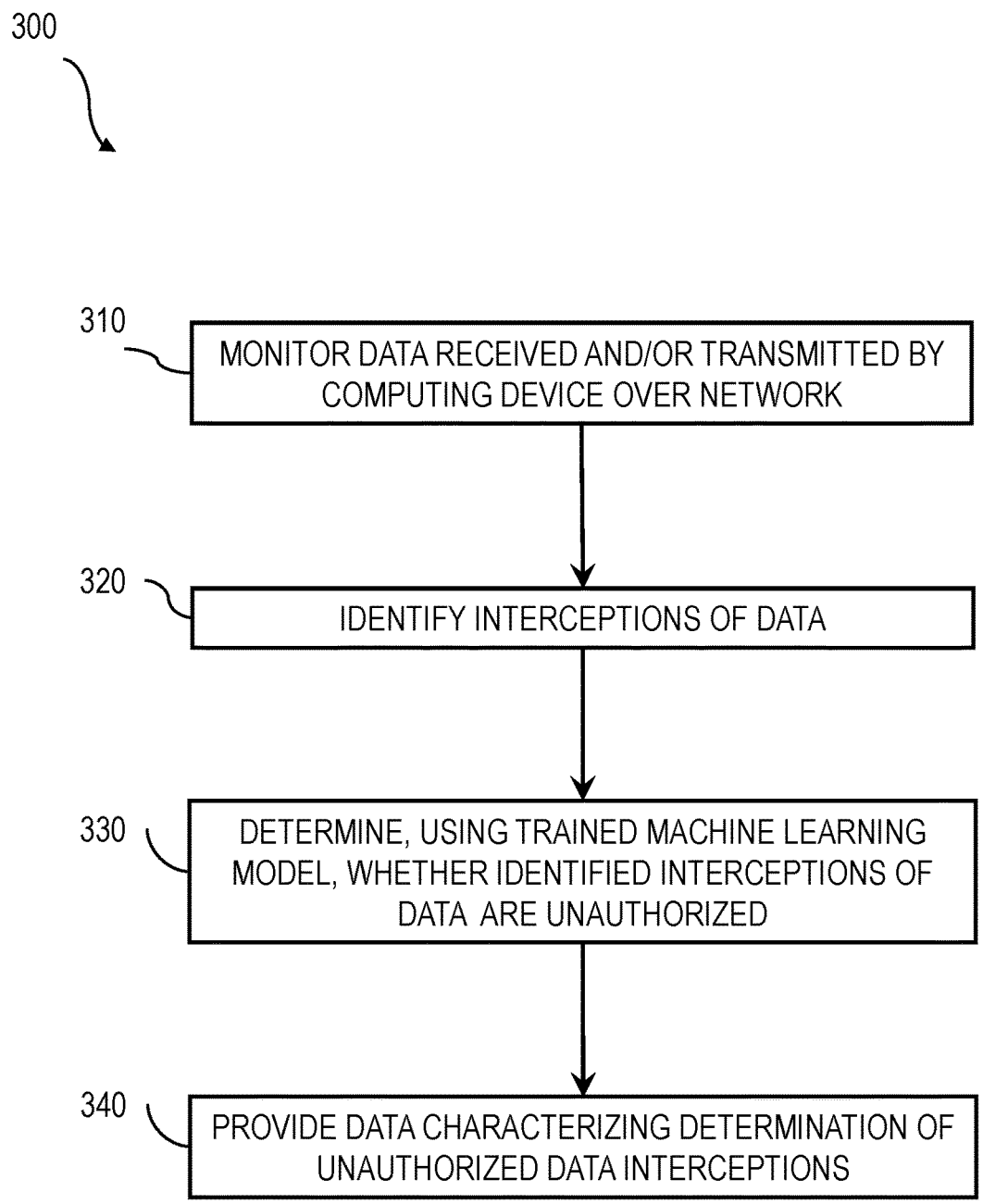
FIG. 3 is a process flow diagram illustrating the run-time use of a trained machine learning model to determine unauthorized interceptions of data.

FIG. 3 is a process flow diagram 300 illustrating run-time aspects of the current subject matter in which, at 310, data received and/or transmitted by a computing device over a network is monitored. Based on such monitoring, at 320, interceptions of the monitored data are identified. It is later determined, using a machine learning model at 330, that at least one of the identified interceptions of the monitored data is unauthorized. Subsequently, at 340, data characterizing the determined at least one unauthorized identified interceptions of the monitored data can optionally be provided (e.g., displayed, loaded, stored, transmitted, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Figure 4:
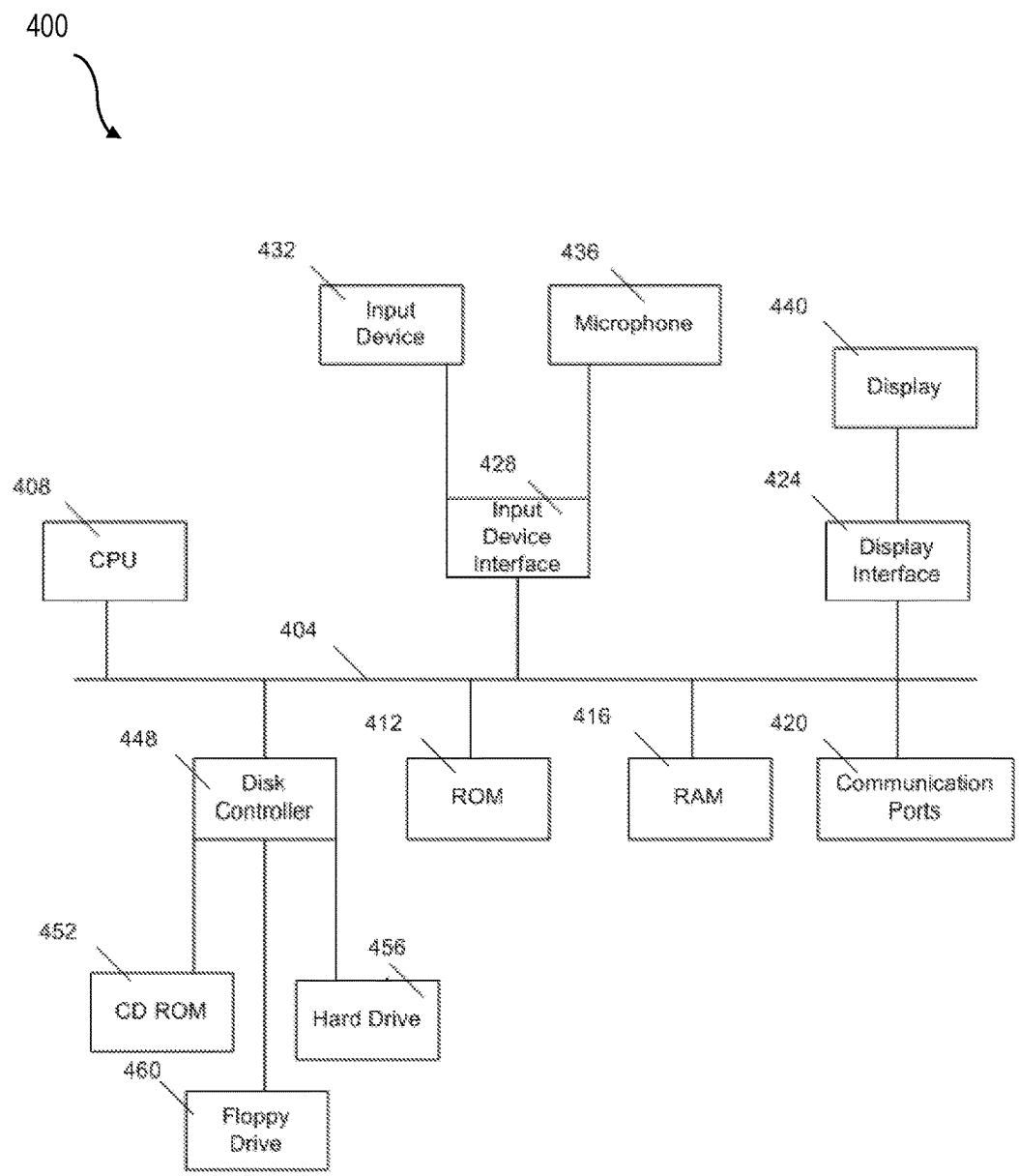
FIG. 4 is a diagram illustrating aspects of a sample computing device that can be used to implement certain aspects of the current subject matter.

FIG. 4 is a diagram illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 414, can be in communication with the processing system 408 and may include one or more programming instructions for the operations specified here. Optionally, program instructions may be stored on a non-transitory computer-readable storage medium such as a magnetic disk, optical disk, recordable memory device, flash memory, or other physical storage medium.

In one example, a disk controller 448 can interface one or more optional disk drives to the system bus 404. These disk drives may be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 to the user and an input device 432 such as keyboard and/or a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback by way of a microphone 436, or tactile feedback); and input from the user may be received in any form, including acoustic, speech, or tactile input. In the input device 432 and the microphone 436 can be coupled to and convey information via the bus 404 by way of an input device interface 428. Other computing devices, such as dedicated servers, can omit one or more of the display 440 and display interface 424, the input device 432, the microphone 436, and input device interface 428.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving data comprising a plurality of samples that each characterize interception of data traffic to a computing device over a network;
   grouping the plurality of samples characterizing the interception of data traffic into a plurality of clusters;
   labeling at least a portion of the samples to characterize a likelihood of each such sample as relating to an unauthorized interception of data traffic, the labeling comprising:
      presenting, in a user interface, at least one exemplary sample from each cluster; and
      receiving, via the user interface, input specifying a label for the corresponding at least one exemplary sample for each cluster;
   assigning each cluster with a label corresponding to a majority of samples within such cluster; and training at least one machine learning model using the assigned labeled clusters which, once trained, determines a likelihood of future samples as relating to an unauthorized interception of data traffic to a corresponding computing device.

2. The method of claim 1, wherein the grouping comprises:
determining a similarity metric for each sample in relation to each other sample;
wherein the clusters are grouped using the determined similarity metrics.

3. The method of claim 1 further comprising:
dividing, using a divisive clustering algorithm, at least one cluster until a threshold number of samples within each cluster has a same label;
wherein each cluster assigned with a label includes at least one cluster divided using the divisive clustering algorithm.

4. The method of claim 1, wherein the samples encapsulate attributes selected from a group consisting of: originating IP address of a request, media access control (MAC) addresses for intervening routers, geo-location of a receiving computing device, time of day, frequency of requests, data packet size and frequency, data transfer protocol, whether or not compression was requested, Domain Name System (DNS) values, multicast Domain Name System (mDNS) values, packet payload information, data type of returned information, or whether returned information is a truncated version of expected returned information.

5. The method of claim 1 further comprising:
receiving, in real-time during operation of a second computing device, a new sample characterizing interception of data traffic to the second computing device;
determining, using, the machine learning model, whether the new sample relates to an unauthorized interception of data traffic to the second computing device; and
providing data characterizing the determination of whether the new samples relates to an unauthorized interception of data traffic to the second computing device.

6. The method of claim 5, wherein the providing data characterizing the determination of whether the new samples relates to an unauthorized interception of data traffic to the second computing device comprises at least one of: displaying such data in an electronic visual display, transmitting such data to a remote computing system, loading such data into memory, or persisting such data into a physical data storage medium.

7. The method of claim 1, wherein the at least one exemplary sample is randomly selected.

8. The method of claim 1, wherein the at least one exemplary sample is selected using a query by committee method.

9. The method of claim 8, wherein the query by committee method performs classifications on all unlabeled samples with different classification models that are trained with current labeled data.

10. A computer-implemented method comprising:
monitoring data received and/or transmitted by a computing device over a network; identifying interceptions of the monitored data;
determining, using a machine learning model, that at least one of the identified interceptions of the monitored data is unauthorized; and
providing data characterizing the determined at least one unauthorized identified interceptions of the monitored data;
wherein the machine learning model is trained using assigned label clusters generated by:
receiving data comprising a plurality of historical samples that each characterize interception of data traffic to a computing device over a network;
grouping the plurality of historical samples characterizing the interception of data traffic into a plurality of clusters;
labeling at least a portion of the historical samples to characterize a likelihood of each such sample as relating to an unauthorized interception of data traffic;
assigning each cluster with a label corresponding to a majority of historical samples within such cluster.

11. The method of claim 10 wherein the assigned label clusters are further generated by:
dividing, using a divisive clustering algorithm, at least one cluster until a threshold number of samples within each cluster has a same label;
wherein each cluster assigned with a label includes at least one cluster divided using the divisive clustering algorithm.

12. The method of claim 10, wherein the providing data characterizing the determined at least one unauthorized identified interceptions of the monitored data comprises at least one of: displaying such data in an electronic visual display, transmitting such data to a remote computing system, loading such data into memory, or persisting such data into a physical data storage medium.

13. The method of claim 10, wherein the grouping comprises:
determining a similarity metric for each historical sample in relation to each other historical sample;
wherein the clusters are grouped using the determined similarity metrics.

14. The method of claim 10, wherein the historical samples encapsulate attributes selected from a group consisting of: originating IP address of a request, media access control (MAC) addresses for intervening routers, geo-location of a receiving computing device, time of day, frequency of requests, data packet size and frequency, data transfer protocol, whether or not compression was requested, Domain Name System (DNS) values, multicast Domain Name System (mDNS) values, packet payload information, data type of returned information, or whether returned information is a truncated version of expected returned information.

15. The method of claim 10, wherein the labeling comprises:
presenting, in a graphical user interface, an exemplary historical sample from each cluster; and
receiving, via the graphical user interface, a label for the corresponding exemplary historical sample for each cluster.

16. A system comprising:
at least one data processor; and
memory storing instructions which, when executed by at least one data processor, result in operations comprising:
receiving data comprising a plurality of samples that each characterize interception of data traffic to a computing device over a network;
grouping the plurality of samples characterizing the interception of data traffic into a plurality of clusters;
labeling at least a portion of the samples to characterize a likelihood of each such sample as relating to an unauthorized interception of data traffic;

assigning each cluster with a label corresponding to a majority of samples within such cluster; and training at least one machine learning model using the assigned labeled clusters which, once trained, determines a likelihood of future samples as relating to an unauthorized interception of data traffic to a corresponding computing device.

17. The system of claim 16, wherein the grouping comprises:

determining a similarity metric for each sample in relation to each other sample;

wherein the clusters are grouped using the determined similarity metrics.

18. The system of claim 16, wherein the operations comprise:

dividing, using a divisive clustering algorithm, at least one cluster until a threshold number of samples within each cluster has a same label;

wherein each cluster assigned with a label includes at least one cluster divided using the divisive clustering algorithm.

19. The system of claim 16, wherein the samples encapsulate attributes selected from a group consisting of: originating IP address of a request, media access control (MAC) addresses for intervening routers, geo-location of a receiving computing device, time of day, frequency of requests, data packet size and frequency, data transfer protocol, whether or not compression was requested, Domain Name System (DNS) values, multicast Domain Name System (mDNS) values, packet payload information, data type of returned information, or whether returned information is a truncated version of expected returned information.

20. The system of claim 16, wherein the operations further comprise:

receiving, in real-time during operation of a second computing device, a new sample characterizing interception of data traffic to the second computing device;

determining, using, the machine learning model, whether the new sample relates to an unauthorized interception of data traffic to the second computing device; and providing data characterizing the determination of whether the new samples relates to an unauthorized interception of data traffic to the second computing device.

21. The system of claim 20, wherein the providing data characterizing the determination of whether the new samples relates to an unauthorized interception of data traffic to the second computing device comprises at least one of: displaying such data in an electronic visual display, transmitting such data to a remote computing system, loading such data into memory, or persisting such data into a physical data storage medium.

22. The system of claim 16, wherein the labeling comprises:

presenting, in a graphical user interface, an exemplary sample from each cluster; and receiving, via the graphical user interface, a label for the corresponding exemplary sample for each cluster.

23. A system comprising:

at least one data processor; and memory storing instructions which, when executed by the at least one data processor, result in operations comprising:

monitoring data received and/or transmitted by a computing device over a network;

identifying interceptions of the monitored data;

determining, using a machine learning model, that at least one of the identified interceptions of the monitored data is unauthorized; and providing data characterizing the determined at least one unauthorized identified interceptions of the monitored data;

wherein the machine learning model is trained using assigned label clusters generated by:

receiving data comprising a plurality of historical samples that each characterize interception of data traffic to a computing device over a network;

grouping the plurality of historical samples characterizing the interception of data traffic into a plurality of clusters;

labeling at least a portion of the historical samples to characterize a likelihood of each such sample as relating to an unauthorized interception of data traffic;

assigning each cluster with a label corresponding to a majority of historical samples within such cluster.

24. The system of claim 23 wherein the assigned label clusters are further generated by:

dividing, using a divisive clustering algorithm, at least one cluster until a threshold number of samples within each cluster has a same label;

wherein each cluster assigned with a label includes at least one cluster divided using the divisive clustering algorithm.

25. The system of claim 23, wherein the providing data characterizing the determined at least one unauthorized identified interceptions of the monitored data comprises at least one of: displaying such data in an electronic visual display, transmitting such data to a remote computing system, loading such data into memory, or persisting such data into a physical data storage medium.

26. The system of claim 23, wherein the grouping comprises:

determining a similarity metric for each historical sample in relation to each other historical sample;

wherein the clusters are grouped using the determined similarity metrics.

27. The system of claim 23, wherein the historical samples encapsulate attributes selected from a group consisting of: originating IP address of a request, media access control (MAC) addresses for intervening routers, geo-location of a receiving computing device, time of day, frequency of requests, data packet size and frequency, data transfer protocol, whether or not compression was requested, Domain Name System (DNS) values, multicast Domain Name System (mDNS) values, packet payload information, data type of returned information, or whether returned information is a truncated version of expected returned information.

28. The system of claim 23, wherein the labeling comprises:

presenting, in a graphical user interface, an exemplary historical sample from each cluster; and receiving, via the graphical user interface, a label for the corresponding exemplary historical sample for each cluster.

* * * * *